INVENTOR.
STEFAN DOROGI

United States Patent Office 3,654,065
Patented Apr. 4, 1972

3,654,065
FLAT-SHAPED ARTICLES OF VINYL POLYMERS AND PROCESS OF PRODUCING SAME
Stefan Dorogi, Geislingen-Steige, Germany, assignor to Goeppinger Raliko- und Kunstleder-Werke GmbH, Goeppingen, Germany
Filed July 22, 1968, Ser. No. 746,392
Int. Cl. B29d 27/00; C08f 29/24, 47/08
U.S. Cl. 161—159                                      36 Claims

ABSTRACT OF THE DISCLOSURE

Microporous, air- and water vapor-permeable, water-absorbing sheets, films, foils, or the like flat-shaped articles of vinyl polymers, preferably of homopolymers and co-polymers of vinylchloride, are produced by incorporating into the plasticized vinyl polymer compound an aqueous solution of a water soluble vinyl or the like polymer, subjecting the mixture to the action of shearing forces, applying the resulting plastic mixture to a fibrous web serving as support, removing the water from the coating or impregnation under conditions whereby no bubbles are formed, gelling the vinyl polymer by heating, removing the water soluble vinyl or the like polymer by washing from the coating or impregnation, and drying the resulting flat-shaped article. If desired, self-supporting foils are obtained by stripping the coating from the support. The resulting flat-shaped article may be laminated to various kinds of fibrous web before or after removing, by washing, the water soluble components of the vinyl polymer compound.

The vinyl polymer may have admixed thereto other film-forming polymers compatible therewith, plasticizers, extenders, fillers, dyestuffs, pigments, lubricants, antioxidants, stabilizers, anti-aging agents, and, if desired, vulcanization accelerators, cross-linking agents, and other conventionally used additives.

The resulting microporous foils having a microscopically fine cellular reticulate structure and laminates thereof with fibrous webs may be grained, stamped, embossed, printed, dyed, lacquered, and/or subjected to other finishing processes.

The flat-shaped articles according to the present invention are useful for all purposes requiring air- and water vapor-permeability and/or water-absorbing properties, for instance, as artificial leather to be used as upholstery material, in the garment and shoe industry, and for other purposes.

FIELD OF INVENTION

The present invention relates to flat-shaped articles and more particularly to coated and/or impregnated woven, knitted or felted articles, self-supporting sheets, films, or foils, and articles produced therefrom by laminating, said articles being of microcapillary structure, air- and water vapor-permeable and water-absorbing and being useful as artificial leather and for similar purposes, as well as to a process of producing such articles.

DESCRIPTION OF THE PRIOR ART

Artificial leather has been produced from highly plasticized polyvinylchloride foils or sheets. These sheets are either used in combination with a support or carrier material such as woven or knitted fabric or felted textile material, or in the form of a self-supporting foil or sheet. Artificial leather made from polyvinylchloride can be processed according to various methods so as to have the appearance and properties of genuine leather. Such artificial leather combines excellent stability and durability with good mechanical strength properties. Thus it is well suited to replace genuine leather in many fields of application. Leather, however, when suitably prepared and processed, has one property which artificial leather as heretofore produced, did not possess, namely the ability to permit air and water vapor to permeate therethrough and to absorb water and again to release it. This property is of the greatest importance for all those uses whereby leather is in close contact with the perspiring human skin, for instance, when used for garments, as shoe leather, upholstery material, and the like.

Attempts have been made to render plastic films or foils porous and thus permeable to air and water vapor by incorporating thereinto water-soluble compounds which are subsequently removed by washing with water. These attempts, however, have not been fully successful when using fluid plastic materials such as polyvinylchloride-plasticizer pastes as components. The reason for this failure is that the water-soluble compounds are completely enclosed and covered by the impermeable plastic material. As a result thereof access of the water to the water-soluble, pore-forming compounds is impeded or prevented so that they cannot be dissolved out even on prolonged washing.

Although removal of incorporated, water-soluble salts, such as sodium chloride, by washing may be improved by specific modifications of the known processes, it is not possible to produce foils, films, or sheets having capillary hollow spaces or cells of substantially uniform, microscopic size and cross-section. Only films or sheets with a limited number of large hollow spaces or cells of irregular shape are obtained thereby. Although such sheets or films are capable of allowing air and water vapor to permeate therethrough, they do not have a satisfactory perspiration-absorbing power because their hollow spaces or cells are not capillary. Furthermore, such sheets or films possess only unsatisfactory mechanical strength properties due to their sponge-like structure with macroscopically visible pores of irregular and nonuniform cross-section.

SUMMARY OF INVENTION

It is one object of the present invention to provide new and valuable flat-shaped articles, self-supporting sheets, films, or foils, or laminated articles produced therefrom which are made from vinyl polymers and are microcapillary, air- and water vapor-permeable, and water-absorbing which have capillary hollow spaces or cells of microscopic size and cross-section, and which are especially useful in the manufacture of artificial leather, that is superior in chemical and physical properties to artificial leather as produced heretofore.

Another object of the present invention is to provide artificial leather superior in its chemical and physical properties to known types of artificial leather.

A further object of the present invention is to provide a simple and effective process of producing such flat-shaped articles and especially artificial leather.

A further object of the present invention is to provide laminated products having such films or foils laminated to air- and water vapor-permeable carrier materials such as woven or knitted fabrics, fleece, and other kinds of fibrous web material.

Other objects of the present invention and advantageous features thereof will become apparent as the description proceeds.

In principle the process of producing such flat-shaped, air- and water vapor-permeable and water-absorbing articles of vinyl polymers of microcapilllary structure comprises the following process steps:

(a) An aqueous solution of polyvinyl alcohol or other water-soluble vinyl polymers and copolymers is prepared.
(b) A paste-like mixture of a substantially water-insoluble vinyl polymer with suitable plasticizers is prepared.

(c) The first mentioned aqueous solution is intimately mixed with said paste-like mixture.

(d) The resulting mixture is exposed to the action of shearing forces created, for instance, by grinding on roller mills or other working procedures.

(e) A supporting or carrier material is coated and/or impregnated with the thus worked mixture.

(f) Most of the water and, if present, other volatile components contained therein are evaporated under conditions whereby substantially no bubbles are formed, preferably at a temperature not substantially exceeding 80° C.

(g) The resulting flat-shaped article is then further dried preferably at a temperature above 100° C. but not above 130° C. to cause complete removal of the water and the other volatile components.

(h) Thereafter the article is gelled and solidified by heating to a temperature as conventionally employed for gelling vinylchloride polymers, preferably by heating to a temperature between about 150° C. and about 220° C.

(i) Is repeatedly washed with water and the water is squeezed off to remove the water-soluble components, and (j) Is finally dried, preferably at a temperature not exceeding about 90° C.

The process according to the present invention as described hereinabove yields self-supporting foils, films, sheets, or coated or impregnated flat-shaped articles which can be provided with a leather-like grain by embossing before washing out the polyvinyl alcohol and the other water-soluble additions and which may be subjected to any type of finishing processes, such as printing, shading, lacquering and the like before or after washing out the water soluble components. Said articles have a microscopically small cellular or hollow space structure which is highly characteristic therefor.

The foils, films, sheets, and their laminates or the flat-shaped articles obtained by coating or impregnating woven or knitted fabrics, fleeces, or felted webs have air permeability values of at least 500 ml./100 sq. cm./min./cm. Hg, water vapor-permeability values of at least 1000 g./100 sq. m./hour, and a surprisingly high water absorbing power of at least 20% of their dry weight.

Determination of the water vapor permeability is carried out according to the specification DIN 53,122. The air permeability is determined by means of the Schopper apparatus (Leipzig) under a gauge pressure of 10 cm. water column. The water absorbing power is determined by covering one side of the article, foil, or laminate with a 3 cm. high layer of distilled water for one hour.

The flat-shaped structures, foils, or laminates produced according to the present invention are useful for all those purposes whereby air and water vapor permeability and water absorbing power is required, for instance, as artificial leather in the upholstery, clothing, and shoe industry, and for similar purposes.

In place of polyvinyl alcohol or in addition thereto, there may be used for preparing the aqueous solution according to step (a) copolymers of vinyl alcohol, partly saponified polyvinyl esters, saponified vinyl esters which are graft-copolymerized upon polyalkylene oxides and/or polymers of open-chain, tertiary vinylamides as they are described, for instance, in German Auslegeschrift No. 1,260,789. Part of the polyvinyl alcohol and/or the other water-soluble vinyl polymers may be replaced by other water-soluble, film-forming, macromolecular compounds such as salts of polyacrylic acid, starch, alginates, and the like.

Especially suitable water-soluble polymers are acetyl group-containing polyvinyl alcohol types. These polymers possess a better water solubility and stability against high temperatures than acetyl group-free polyvinyl alcohol. They are also better compatible with, and are more thoroughly distributed throughout the substantially water-insoluble vinyl polymer than acetyl group-free polyvinyl alcohol.

Said water-soluble polymers are preferably plasticized by the addition of difficultly volatile, water-soluble compounds such as polyalcohols, for instance, glycerol. Such plasticizers are added to the polyvinyl alcohol and the like aqueous solution in order to retard complete evaporation of the water therefrom.

In place of glycerol, there may be used other polyhydroxy compounds, for instance, water-soluble glycols such as ethylene glycol, propylene glycols, butylene glycols, trimethylol propane (2-hydroxy methyl-2-ethyl propane-1,3-diol), hexanetriol (3-hydroxy methyl pentane-2, 4-diol), polyhydric alcohols with four to six hydroxyl groups in their molecule such as erythritol, pentaerythritol, mannitol, sorbitol, and also polyglycols with other groups in their molecule provided they have a plasticizing effect and are miscible with water between 0° C. and 100° C. such as diethylene glycol, triethylene glycol, and others.

The substantially water-insoluble vinyl polymer used in step (b) for preparing the paste of such polymer is preferably a homopolymer or a copolymer of vinylchloride which is converted into the paste by means of a liquid plasticizer for such a polymer. Preferred copolymers of vinylchloride are those with vinyl acetate. Such vinylchloride acetate copolymers can be gelled, i.e. solidified at a lower temperature than the homopolymers of vinylchloride. Other copolymers of vinylchloride with other polymerizable monomers may also be used for the purpose of the present invention provided they can be converted into plastisols or, respectively, organosols by the addition of plasticizers and, if required, solvents for such plasticizers. It is understood, of course, that the homopolymers or copolymers of vinylchloride can be used as such or in mixture with each other. Especially suitable have proved polyvinylchloride types which contain only small amounts of surface active agents or none at all. Excellent results are achieved when using at least two different vinyl polymers which can be pasted and of which the one has a median K-value of about 67 to 72 while the other one has a high K-value of about 75 to 80.

The following method may be given to determine whether a homopolymer or a copolymer of vinylchloride is suitable for the purpose of the present invention:

A spreadable paste is produced from 100 parts, by weight, of the vinyl polymer to be tested,
70 parts, by weight, of di-2-ethyl hexyl phthalate,
2 parts, by weight, of a mixture of barium and cadmium laurate (2:1), and
2 parts, by weight, of lampblack.

This paste is mixed with a solution of 50 parts, by weight, of polyvinyl alcohol, in
117 parts, by weight, of water.

The resulting mixture is passed twice through a three-roller mill. A vinyl polymer which is suitable for the purpose of the present invention yields a spreadable paste or coating composition which shows under the microscope the structure illustrated in FIG. 4 described hereinbelow.

Suitable plasticizers which form plastisols with such vinyl polymers are, for instance, the conventionally used monomeric polyvinylchloride plasticizers such as di-2-ethyl hexyl phthalate, di-isooctyl phthalate, butyl benzyl phthalate, mixtures of straight-chain heptyl, octyl, and nonyl phthalates, di-isodecyl phthalate, analogous esters of adipic acid, azelaic acid, and/or sebacic acid, esters of phosphoric acid such as tricresyl phosphate, and others. Polymeric plasticizers such as the polyesters of polyhydroxy compounds and polycarboxylic acids, for instance, the polyester sold by Monsanto Chemical Co. under the trademark "Santicizer 464," may also be used. If necessary, liquid volatile additives which do not dissolve the vinylchloride polymers, such as toluene, may be added.

Monomeric and polymeric plasticizers may also be used in mixture with each other or combined with extenders, such as chlorinated paraffins, and the like.

Any liquid, so-called monomeric or primary plasticizer as conventionally used in artificial leather production may be employed together with polymeric plasticizers for the respective vinyl polymer. Up to 80% of the monomeric plasticizers may be replaced by such polymeric plasticizers, if coatings, impregnated sheets or self-supporting foils of especially high resistance to extraction and/or high non-fogging properties are required.

Preferably the amount of monomeric primary plasticizer such as di-2-ethyl hexyl phthalate, in the vinyl polymer paste may amount up to about 100 parts, by weight, for each 100 parts, by weight, of polyvinylchloride or the vinyl polymer. Amounts between 50 parts and 70 parts, by weight, of plasticizer for 100 parts, by weight, of polyvinylchloride are especially useful if only monomeric plasticizers are used. When using mixtures of monomeric and polymeric plasticizers, up to 96 parts, by weight, of the polymeric plasticizer may be added in addition to up to 20 parts, by weight, of monomeric plasticizer for each 100 parts, by weight, of the vinyl polymer.

The amounts of plasticizer added and especially the amount of liquid plasticizer added depends, of course, upon the type of polyvinylchloride and other water-insoluble polymer used and can readily be determined by simple preliminary tests known to the art of producing plastisols or organosols.

It has also been found that microcapillary sheets, films, or foils, of excellent usefulness are obtained by replacing part of the primary plasticizer or of the mixture of monomeric and polymeric plasticizer which may also contain extenders, by solid plasticizers as they are used for vinyl polymers. Suitable solid plasticizers are, for instance, polyvinylchloride-compatible film-forming polymers, such as linear polyurethanes; butadiene-acrylonitrile rubber; copolymers of butadiene, acrylonitrile, and styrene; polyacrylic acid esters, and the like. These solid plasticizers may be added as such or in mixture with each other. Their presence in the final flat-shaped article, sheet, or foil increases the mechanical strength properties of said structures and especially when using butadiene-acrylonitrile rubber, their flexibility at low temperatures. Such additives also improve the migration resistance.

In addition to the above mentioned amounts of monomeric and polymeric plasticizers there may be admixed up to 100 parts, by weight, of such solid plasticizers (polyurethanes, polyacrylonitrile rubbers). Preferably, a combination of up to 50 parts, by weight, of the solid plasticizers and between 30 parts to 50 parts, by weight, of liquid plasticizer (monomeric and/or polymeric) is used for plasticizing the vinyl polymer.

If the polyvinylchloride-compatible, film-forming material such as butadiene-polyacrylonitrile rubber, polyurethanes, or the like are vulcanizable and can be cross-linked, vulcanization or cross-linking may be effected with or without the addition of vulcanizing agents, vulcanization accelerators, or cross-linking agents.

Said vinylchloride polymer pastes may also have incorporated therein suitable dyeing agents, such as the pigments conventionally used in non-porous polyvinylchloride foils. Carbon black, chrome yellow, molybdate red, phthalocyanine blue or green, chromium oxide green, chromium oxide hydrate green, titanium dioxide, various metal bronze pigments, heat- and light-resistant organic pigments which are insoluble in the plasticizers, and the like inorganic and organic pigments have proved to be especially useful. The organic pigment sold by Farbwerke Hoechst under the trademark "PV-Fast red B" and similar pigments may, for instance, be used.

Stabilizers, fillers, anti-oxidants, expanding or foaming agents, anti-aging agents and agents protecting vinylchloride polymers against the action of light as they are conventionally used in the manufacture of non-porous artificial polyvinylchloride leather, may also be added to the paste. Suitable fillers are, for instance, chalk, siliceous chalk, barium sulfate, highly disperse silicic acid, kaolin, and others.

The amounts of dyeing agents and pigments, fillers and other additives admixed to the polyvinylchloride paste are in general the same as conventionally used in the manufacture of non-porous artificial polyvinylchloride leather.

The macromolecular additives which are compatible with the vinyl polymer and which are added thereto in order to improve certain properties of the resulting products, such as polyurethanes, butadiene-polyacrylonitrile rubber, or the other additives mentioned hereinabove, can be admixed to the vinyl polymer plastisol or organosol in the form of their solutions in suitable organic solvents which do not dissolve polyvinylchloride or its copolymers at 20° C. The preferred solvent is toluene or mixtures of toluene and n-butanol. Aqueous dispersions of such macromolecular additives may also be used. Film-forming additives in solid form are preferably dissolved in the plasticizers used for preparing the vinyl polymer paste. If necessary, solution in said plasticizers is achieved by heating and/or by the addition of volatile solvents which do not dissolve or cause swelling of the vinyl polymer. Aromatic hydrocarbons such as toluene have proved to be especially suitable dissolving aids.

Polyurethanes can be admixed to the vinyl polymer paste in the form of their aqueous dispersions. Butadiene-polyacrylonitrile rubber, three- or four-component polymers composed of butadiene, acrylonitrile, styrene, and if desired, of an unsaturated carboxylic acid such as methacrylic acid may also be admixed in the form of an aqueous dispersion to the vinyl polymer paste. Such additives are preferably stabilized by the addition of protective colloids such as fatty acid glycol esters before they are admixed to the paste.

The polyvinylchloride paste is prepared, for instance, by intimately mixing the pulverulent vinylchloride homopolymer or copolymer with the liquid plasticizer or plasticizer mixture, if required, with the addition of volatile diluents. Any of the conventional mixing devices such as planet stirrers, kneading devices, dissolvers with rapidly rotating stirrers, and others more as they are conventionally employed in plastic working may be used therefor.

Mixing of the aqueous solution of the polyvinyl alcohol and the like water-soluble vinyl homopolymers and copolymers with the plasticizer-containing paste of a water-insoluble vinyl homopolymer or copolymer is effected in suitable mixing devices, preferably the mixing devices used for preparing the vinyl polymer paste, such as planet stirrers, kneading devices, and others as used for preparing the above described plastisol or organosol.

It has also proved to be of advantage to admix surface-active agents to the resulting mixture of vinyl polymer, plasticizer and polyvinyl alcohol. These agents promote penetration of the wash water used in the washing step. Preferably an oil-soluble as well as water-soluble surface-active agent is added.

The resulting mixture is then exposed to the action of shearing forces. Such a treatment consists, for instance, in passing the mixture through grinding surfaces which slidingly glide over each other with a small space therebetween. Suitable apparatus for this shearing treatment are, for instance, two- or three-roll mills, or similar machines as they are used in the lacquer and paint industry. Such a shearing treatment causes thorough and intimate intermixing of the polyvinyl alcohol solution and the vinyl polymer paste so that, after evaporation of the water from said mixture, the polyvinyl alcohol as well as the vinyl polymer remain in the resulting substantially water-free mixture in the form of two microscopically fine reticulate systems which completely penetrate, and are intimately intermixed with, each other and, due to the specific emulsifying effect of the polyvinyl alcohol under the influence of shearing forces, produce the desired novel microcapillary structure of the articles produce according to this invention.

The shearing treatment produces a spreadable paste of macroscopically homogeneous appearance which, however, is microscopically inhomogeneous.

The resulting mixture is then spread in the desired thickness upon a carrier or supporting material, such as a woven or knitted fabric, a fleece, felted web removable paper, and other kind of fibrous webs. Such fabrics or fibrous webs may also be impregnated with said coating paste.

The coated or impregnated carrier or support is then carefully heated, for instance, by means of warm air, to a temperature preferably not exceeding about 80° C. and most advantageously to a temperature between 30° C. and 40° C. so as to slowly evaporate most of the water and of the other volatile components present in the resulting sheet-like article. Such evaporation must be carried out under conditions that too rapid removal of the water and, as a result thereof, formation of bubbles are avoided. The water is removed to such an extent that the resulting article can be rolled after each coating or impregnating step. Preferably this drying step is carried out in chambers wherein the sheets are suspended from suitable holders. Complete removal of the water at this stage of the process according to the present invention is not desired because the reticulate structure of polyvinyl alcohol and/or its substitutes which is very thoroughly distributed throughout the sheet or article, will be so fragile and sensitive to breaking when completely waterfree, that it will break even if exposed to the slightest bending force. This is the reason why glycerol or the like compounds are added to the solution of polyvinyl alcohol and/or its substitutes in amounts between about 10%, by weight, and about 100%, by weight, and preferably between about 30%, by weight, and about 50%, by weight, calculated for the polyvinyl alcohol and/or its substitute.

After the entire coating or impregnating mixture has been spread upon the support or carrier, the sheet-like structure is conducted in well supported condition and without exposure to bending forces, for instance, through a tunnel drying oven or attached to a stenter, and is completely freed of residual water by drying at a temperature above about 100° C. but not substantially exceeding 130° C., preferably by hot air.

Thereafter, the polyvinylchloride or other water-insoluble vinyl polymer present in the sheet-like structure is caused to gel and solidify, for instance, by heating to a temperature in a manner conventionally used for gelling vinyl polymers, such as by heating to a temperature between about 150° C. and about 210° C. and preferably between 180° C. and 220° C. During said gelling step the sheet-like structure may be embossed or grained while still hot. Embossing or graining may also be carried out in a separate working step after gelling.

Of course, the above described mode of removing the water from the sheet-like structure represents one of the possible embodiments of the process according to the present invention. Any other method of removing the water from the structure before gelling may be employed provided the formation of bubbles and breaking of the sheet are avoided.

The resulting coated or impregnated support or carrier is then freed of its water-soluble components by washing with water and squeezing off the water.

Thereafter, the residual water is removed by heating preferably to a temperature not substantially exceeding 90° C.

After washing and final drying, the resulting polyvinylchloride sheet or flat-shaped article exhibits a microscopically fine cellular structure, whereby the cells or hollow spaces extend and are uniformly distributed throughout the entire structure. Said cellular structure imparts to the coating or impregnation an extraordinarily high water-absorbing power as well as air and water vapor permeability since it contains a continuous capillary system which extends throughout the fibrous structure of the woven or knitted fabric, fleece, or felted support or carrier for the polyvinylchloride and extends toward and ends in the exposed surface of the polyvinylchloride layer or article.

It has been found that, in order to produce the microcapillary structure according to the present invention, the minimum proportion between water soluble component and mixture of vinyl polymer and plasticizer is about 15 parts, by weight, of polyvinyl alcohol and/or its substitutes to 100 parts, by weight, of said mixture of vinyl polymer and plasticizer. Preferred proportions are a proportion of 25 parts, by weight, to 60 parts, by weight, of the polyvinyl alcohol and/or its substitutes to 100 parts, by weight, of the vinyl polymer-plasticizer mixture.

Preferably a polyvinyl alcohol of low viscosity is used in the form of 25% to 45% aqueous solutions.

The formation of the desired microcapillary structure according to the present invention is dependent, however, not only upon the type and amount of polyvinyl alcohol and/or its substitutes and the concentration of its aqueous solution, but also upon the type of vinyl polymer employed and the proportion of vinyl polymer to plasticizer. Variations of these types and amounts as well as the proportions given hereinabove permit the production of microcapillary structures as required for the different uses. Simple preliminary experiments with the respective components according to the procedure known in the art will readily permit selection of the best proportions for each type of component used as well as for each particular use of the article made therefrom.

For producing a self-supporting foil according to the present invention the polyvinylchloride-plasticizer-polyvinyl alcohol mixture is spread upon a carrier material provided with a layer of a separating agent, such as stripping paper. After gelling the paper is separated from the gelled foil, film, or sheet which is then washed and dried.

The resulting flat-shaped articles or self-supporting films, foils, or sheets produced according to the present invention may be laminated with air and water-vapor permeable structures such as woven and knitted fabric, fleeces, felted and other kinds of fibrous web and/or with artificial leather of plastic foils which have been rendered air and water vapor permeable by conventional means. Preferably the laminating process is effected before washing out the water soluble components so as not to impair the permeability to air and water vapor and the water absorbing power of the laminated products. For this purpose the foil or sheet is laminated while still adhering to its support, after leaving the gelling oven, by being contacted with the fibrous web or other laminating structure continuously and under slight pressure while still hot. The web or structure to be laminated with the vinyl polymer sheet or foil is preferably provided, before lamination, with an adhesive layer by dot-printing it, for instance, with a solution of vinylchloride homopolymer or copolymer, so that its air- and water vapor-permeability is retained.

An important advantage of the process according to the present invention is that it permits to manufacture microcapillary coatings, impregnations, or foils by making use of the methods, machines, and apparatus conventionally used in the industry concerned with the production of artificial leather. Thus the usually employed roller mills, mixing machines, coating, drying, and gelling apparatus, graining and embossing calenders, printing and other finishing devices can be used.

Any desired kind of grain may be imparted to the flat-shaped articles according to this invention by means of graining calenders without impairment of their permeability provided such graining is effected before washing out the polyvinyl alcohol and the other water soluble additives. Likewise the articles or foils can be printed in one or more colors. In order not to impair the air- and water vapor-permeability and the water absorbing power and not to impede and retard washing out of the water soluble components, the printing ink or the lacquer is applied to the foil in a known manner, for instance, by means of a fine point screen.

The flat-shaped articles or foils according to the present invention can be further processed by high frequency welding or by thermal welding. The foils can also be glued to suitable substrates without difficulty by means of adhesives as they are ordinarily used for vinyl polymers. Due to their excellent mechanical strength properties which can be improved in almost any desired manner and to almost any desired degree by the combination with and lamination to woven and knitted fabrics, fleeces, felted or other fibrous webs, as well as due to their air- and water vapor-permeability as well as their perspiration absorbing power, the flat-shaped articles, foils, and the like structures according to the present invention are of special value for all those uses where breathing ability is of importance, i.e. especially in the upholstery or clothing industry.

The coated or impregnated materials, the foils laminated to woven or knitted fabrics, fleeces, felted webs, or other fibrous material, or the foils or sheets as such have proved to be useful in the shoe industry especially as inside lining and as coating for insoles of houseshoes or slippers and of shoes for outdoors wear, as coating material for molded and cushioned soles, as well as after lamination with knitted and woven fabrics, fleeces, and other fibrous webs as substitute vamp or upper leather material for houseshoes and light shoes for outdoor wear, and as insole material.

The artificial leather according to the present invention is also suitable as upholstery material. Such upholstery material is used in automobiles, aeroplanes, ships, and other vehicles, for chairs, sofas, couches, and other types of furniture used in the home, garden, office, for camping, in concert halls, theaters, movie theaters, etc., likewise for cushions of all types.

In the clothing industry the material according to the present invention is used in the manufacture of hats and caps, for instance, as sweatband, furthermore for dresses and garments, belts, and girdles, gloves, and other textile goods.

Another field wherein the articles according to the present invention have been employed is the orthopedic field. On account of their water-absorbing power and their resistance against disinfectants, they are used, for instance, as coatings of invalid-chairs and as upholstery material for bandages and prostheses, and for other purposes.

Handles of any kind, especially of sport equipment are preferably covered with the artificial leather according to the present invention. When used for this purpose, they are favorably distinguished over ordinary artificial leather by their ability to abosrb water and perspiration.

Other uses for which the artificial leather according to the present invention has proved to be well suited are its use in the manufacture of riding equipment, saddles, harnesses, bags, brief cases, suit cases, trunks, book bindings, handbags, protective covers for keys, glasses, and many other articles.

The process of the present invention has the great advantage over the known processes that the aqueous polyvinyl alcohol or the like solution is microscopically finely distributed throughout the vinyl polymer-plasticizer paste due to exposing the mixture to shearing forces. The minute polyvinyl alcohol-water particles extend thereby throughout the paste and into its exposed surface. After spreading the mixture on a support or carrier, evaporating the water, gelling the vinyl polymer, and, if desired, subjecting the resulting structure to suitable shaping and finishing processes, it is readily possible to remove the polyvinyl alcohol or the like water soluble components by washing with water because the numerous capillary channels extending into the surface of the structure and outwardly permit satisfactory access of the wash water to said water soluble components. The reticulate structure of the flat-shaped articles produced by carefully evaporating the water is responsible for completely washing out the water-soluble components.

Thus, as stated above, the process according to the present invention represents a noteworthy advance in the art over the known processes inasmuch as it permits the production of flat-shaped structures which contain numerous microscopically fine, capillary cells or hollow spaces which are interconnected with each other, extend into and are connected with numerous points of their exposed surfaces, and are open towards the outside. Due to the microcapillary structure of the resulting sheets or flat-shaped articles, they possess not only excellent mechanical strength but also permeability to air and water vapor as well as a satisfactory water absorption power.

BRIEF DESCRIPTION OF THE DRAWING

The structure of polyvinyl chloride and the like foils or sheets made according to the known process of washing out a soluble salt and produced according to the present invention is shown in the attached drawings. Thereby FIG. 3 illustrates in cross-sectional view the structure of a mixture of aqueous polyvinyl alcohol and vinyl polymer paste before exposure to shearing forces, while

All these FIGS. 1 to 4 are enlarged 420 times.

Figure 1:
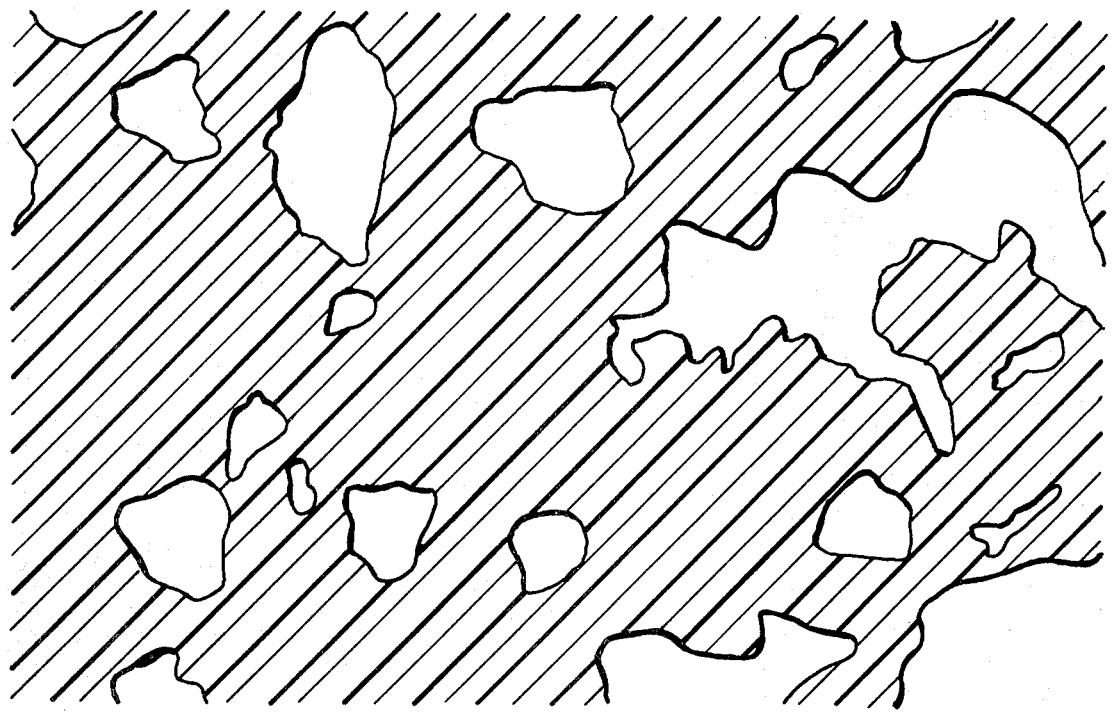
FIG. 1 illustrates in cross-sectional view a polyvinylchloride foil prepared according to the known process of incorporating a water soluble salt, namely sodium chloride, into the polyvinylchloride compound and removing said salt by washing.
Figure 2:
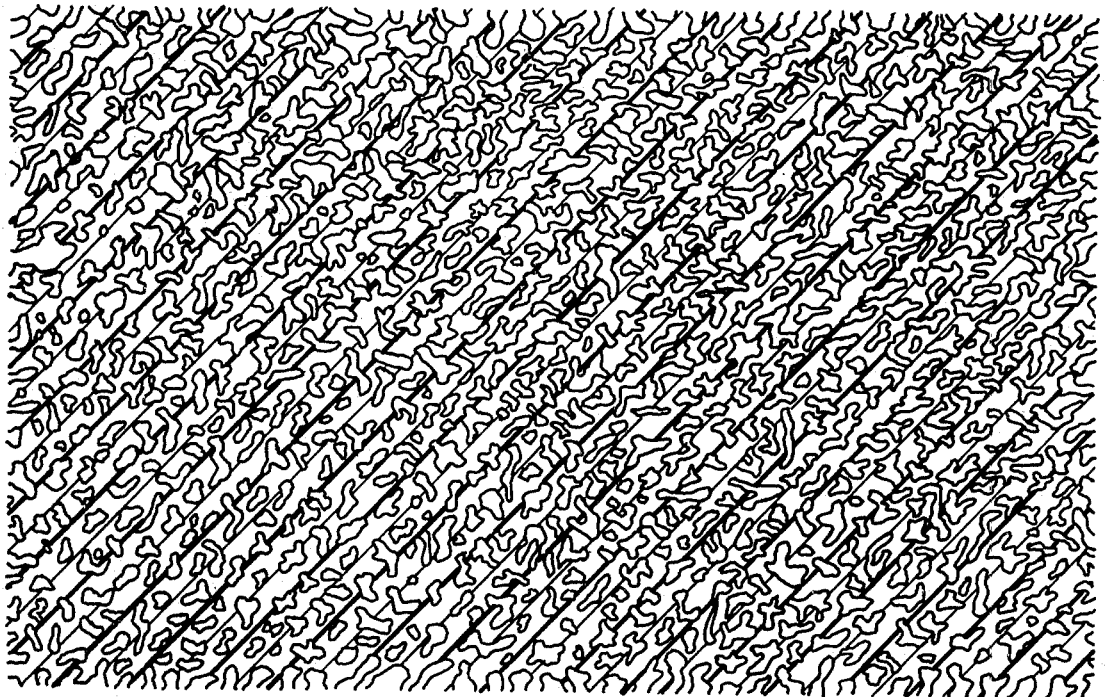
FIG. 2 shows in cross-sectional view a foil prepared according to the present invention.

It is clearly evident from said cross-sectional views that the hollow spaces or cells in the foil of FIG. 2 which is prepared according to the present invention are very considerably smaller than the hollow spaces or cells in the polyvinylchloride foil of FIG. 1 prepared by the known process. In addition to the much smaller size of the hollow spaces or cells in the foil of FIG. 2 according to the present invention, said hollow spaces or cells are also considerably more uniformly distributed throughout the entire foil than the large hollow spaces or cells of the known foil.

Figure 3:
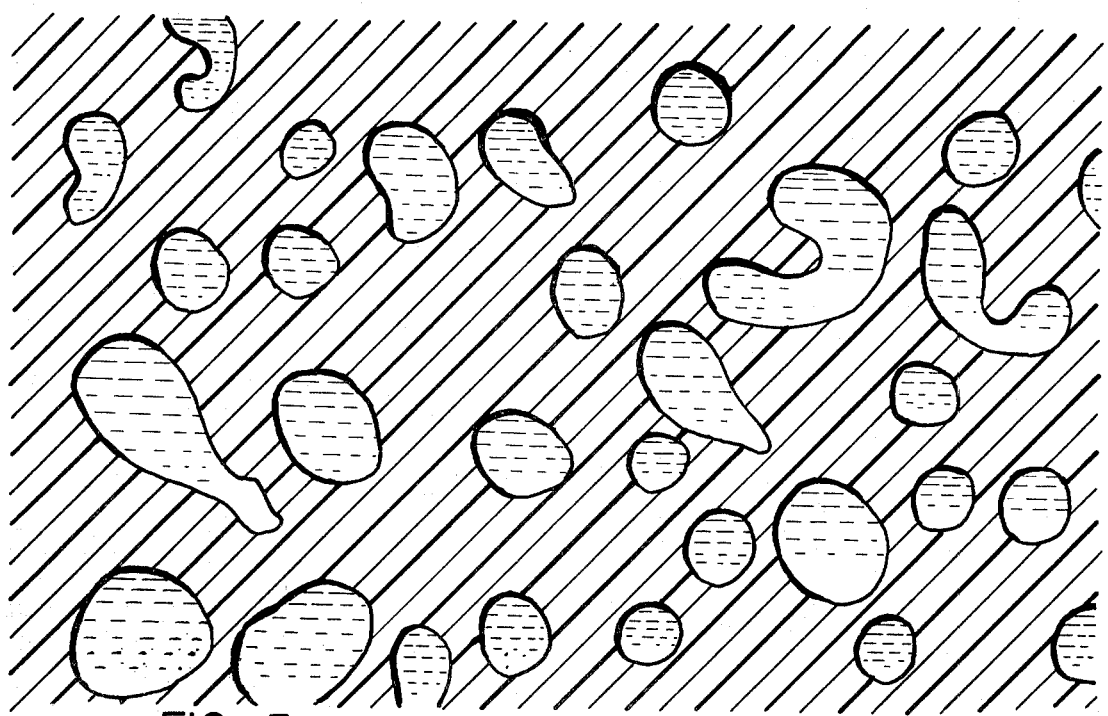

FIG. 3 shows the inner structure of the mixture used for producing the foil of FIG. 2 before exposure to shearing forces, for instance, before working on a three-roll mill. The aqueous polyvinyl alcohol droplets are clearly visible as a liquid disperse phase uniformly distributed throughout the continuous phase of the vinyl polymer-plasticizer paste. They form minute small sphere-like structures. In contrast thereto and as shown in FIG. 4, the droplets of the aqueous polyvinyl alcohol solution and the continuous phase of the vinyl polymer-plasticizer paste are intimately dispersed within each other by the shearing treatment and the discrete droplet structure of the aqueous polyvinyl alcohol phase has disappeared.

After drying, gelling, and removing of the polyvinyl alcohol by washing with water, the microcapillary structure shown in FIG. 2 results. It is evident that the resulting vinyl polymer foil contains uniformly distributed therethrough coherent microscopically fine channels.

Figure 4:
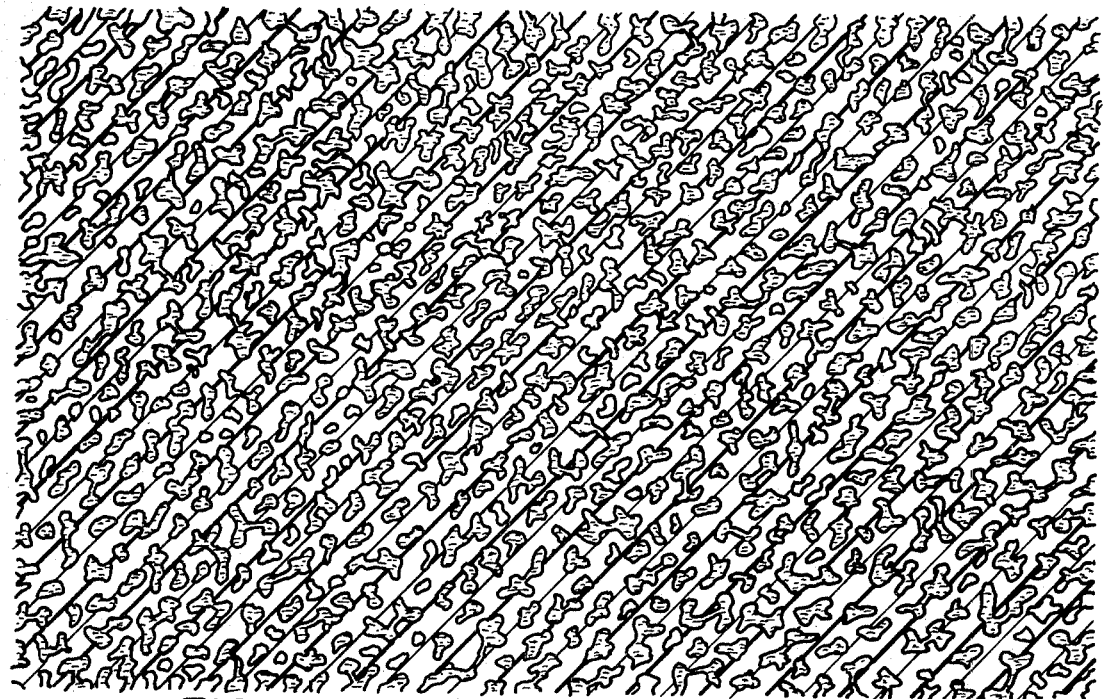
FIG. 4 illustrates in cross-sectional view the same mixture after exposure to shearing forces.

The polyvinyl alcohol-vinyl polymer-plasticizer mixture used for making the foil illustrated in FIGS. 2 to 4 is produced according to Example 1 as given hereinafter.

DESCRIPTION OF THE PREFERRED EMBODIMENTS

The following examples serve to illustrate the present invention without, however, limiting the same thereto. It is also understood that the present invention is not limited to the plasticizers, pigments, stabilizing, anti-aging, foaming, vulcanizing, cross-linking agents, and other additives and to the amounts of said components as they are given in the examples but that these agents and their amounts may be varied according to the contemplated use of the resulting articles.

Example 1

(A) 167 kg. of an aqueous 30% polyvinyl alcohol solution are mixed in a planet stirrer with
(B) 174 kg. of a vinyl polymer paste composed of
100 kg. of an emulsifier-free polyvinylchloride of the K-value 70, which is dispersible to a paste,
70 kg. of di-2-ethyl hexyl phthalate,
2 kg. of a mixture of barium laurate and cadmium laurate (2:1),
4 kg. of lamp-black.

The resulting mixture is twice ground on a three-roll mill.

FIG. 3 illustrates the mixture before grinding and exposure to shearing forces while FIG. 4 shows the mixture after grinding and exposure to shearing forces.

The ground paste is then spread on stripping paper weighing about 100 g./sq. m. After each coating, the paper is dried at about 30° C. for 30 minutes. The final weight of the coating is 500 g./sq. m. The coated paper is dried completely at 100° C. in a hot air drier for 15 minutes. Subsequently the coating is gelled by heating to 185° C. for 5 minutes and, after cooling to room temperature, is separated from the paper. Removing the water-soluble components from the resulting polyvinyl chloride sheet is accomplished by repeatedly washing with water of 90° C., and squeezing by means of squeezing rollers, until a sample of the sheet, after drying at 90° C., exhibits a satisfactory water absorption capacity. Finally the sheet is dried in warm air of 80–90° C.

Example 2

A plastisol, i.e. a spreadable paste is produced by stirring in a planet stirrer (A)

100 kg. of an emulsifier-free polyvinyl chloride of the K-value 70 which is dispersible to a paste,
70 kg. of di-2-ethyl hexyl phthalate,
2 kg. of a mixture of cadmium laurate and barium laurate (1:2), and
5 kg. of iron oxide red.

The paste is thoroughly mixed in a planet stirrer with (B)

133 kg. of a polyvinyl alcohol solution obtained by dissolving
300 kg. of polyvinyl alcohol in 700 kg. of water while stirring. The resulting mixture is passed three times through a three-roll mill.

The resulting mixture is spread in several working steps upon a cotton fabric of a weight of 250 g./sq. m. until the weight of the fabric has increased by 500 g./sq. m. After each coating the coated fabric is dried in warm air at 30–40° C. The coating layer is very brittle even if exposed to slight bending forces. After coating, the coated fabric is heated at 100° C. for 15 minutes. Thereafter the polyvinylchloride is caused to gel by heating at 190–200° C. for four to five minutes. Thereafter, the coating is no more brittle, but shows numerous cracks caused by the preceding treatment.

The gelled layer spread upon the cotton fabric is then passed several times through water heated to 90° C. whereby the water-soluble components of the coating are removed. After each passage the adhering water is squeezed off. Finally the water remaining in the resulting artificial leather is evaporated by heating in hot air at a temperature increasing to 90° C. The resulting artificial leather sheet shows under the microscope the microcapillary structure illustrated in FIG. 2.

The quality values of the resulting artificial leather sheet are as follows:

Water vapor permeability—2500 g./100 sq. m./hr.
Air permeability—600 ml./100 sq. cm./min./cm. Hg.
Water absorption capacity (determined by exposing the surface opposite the fabric to water)—38% of its weight.

Example 3

(A) To prevent the coating to become brittle during coating and drying, a polyvinyl alcohol solution when contains glycerol is used in place of the aqueous polyvinyl alcohol solution. Such a glycerol-containing polyvinyl alcohol solution is prepared by dissolving 300 kg. of polyvinyl alcohol in
580 kg. of water and
120 kg. of glycerol.

133 kg. of said glycerol-containing polyvinyl alcohol solution is intimately mixed with the polyvinyl-chloride paste or plastisol (B) described in Example 2. The procedure is otherwise the same as described in said Example 2. The coating is resistant to breaking when applied to the fabric in several steps and each time dried at 30–40° C. As a result of its resistance to breaking, the coated fabric can be rolled and unrolled and further processed without breaking. After applying the entire coating, the coated fabric is predried at 100° C. and is gelled at 190–200° C. On leaving the gelling chamber, the coated fabric is passed through a pair of embossing rollers so as to provide it with the desired grain. Thereafter, it is freed of its water-soluble components by washing with water of 90° C. and squeezing off the adhering water. The residual wash water is evaporated from the washed sheet by heating with hot air at a temperature up to 90° C.

(C) The resulting artificial leather sheet is printed by means of a roller provided with a dotted screen with a lacquer of the following composition:

100 kg. of a polyvinylchloride solution composed of
10.0 kg. of polyvinylchloride of the K-value 60,
19.7 kg. of toluene,
40.0 kg. of methyl ethyl ketone,
30.0 kg. of tetrahydrofuran, and
0.3 kg. of a mixture of barium laurate and cadmium laurate, and
(D) 50 kg. of a solution of
10.0 kg. of polymethylacrylic acid methyl ester in
90.0 kg. of toluene.

The resulting artificial leather sheet printed with such a lacquer is dried in warm air of 40–50° C. and is then rolled.

The quality values of the final product areas follows:

Water vapor permeability—1800 g./100 sq. m./hr.
Air permeability—540 ml./100 sq. m./min./cm. Hg.
Water absorption from the surface of the coating opposite the fabric side—41% of the weight.

Example 4

(A)

75 kg. of an emulsifier-free polyvinylchloride of the K-value of 70, which is dispersible to a paste,
25 kg. of a copolymer of 90% of vinylchloride and 10% of vinyl acetate of the K-value 60, which is dispersible to a paste,
70 kg. of di-2-ethyl hexyl phthalate,
2 kg. of a mixture of barium laurate and cadmium laurate,
10 kg. of the non-ionogenic emulsifier of the oleic acid polyethylene oxide type, marketed by Badische Anilin- & Soda-Fabrik under the trademark "Emulphor A,"
4 kg. of titanium dioxide,
1 kg. of iron oxide yellow, and
0.5 kg. of bone-black are mixed in a planet stirrer to a paste. The paste is passed once through a three-roll mill and is thoroughly mixed with (B)

263 kg. of a polyvinyl alcohol solution prepared by dissolving
- 300 kg. of polyvinyl alcohol,
- 466 kg. of water, and
- 120 kg. of glycerol The resulting spreadable paste is repeatedly applied to a cotton fabric of a weight of 160 g./sq. m. until the weight of the fabric is increased by 400 g./sq. m. After each application of the paste the coating is dried in warm air of 30° C. The coated and dried fabric is then passed through a channel heated by means of hot air wherein it is heated at 90° C. for 15 minutes. Thereafter, the coating is gelled by heating to 180–190° C. for 5 minutes. The resulting artificial leather sheet is cooled to room temperature and is printed upon a rotogravure printing machine by means of a printing roller and the pattern of which is subdivided into separate hollows.

(C)

The printing solution is composed of
- 10 kg. of a polyvinylchloride of the K-value 60,
- 10 kg. of a copolymer of 90% vinylchloride and 10% of vinyl acetate of the K-value 60, and
- 10 kg. of polymethacrylic acid methyl ester in
  - 117 kg. of toluene,
  - 123 kg. of methyl ethyl ketone,
  - 75 kg. of tetrahydrofuran, and
  - 22 kg. of cyclohexanone.

The mixture of polymers and solvents is milled in a ball mill for 48 hours with
- 16 kg. of cadmium red,
- 16 kg. of iron oxide red,
- 3 kg. of bone-black, and
- 0.5 kg. of a mixture of barium laurate and cadmium laurate.

(D)

The printed artificial leather sheet is dried in warm air of 30–40° C. and is then printed with a layer of the following composition by means of a printing roller provided with a 14 dot screen:
- 10 kg. of polyvinyl chloride of the K-value 60,
- 10 kg. of polymethacrylic acid methyl ester,
- 2.5 kg. of highly disperse silicic acid,
- 0.3 kg. of a liquid, complex organo-tin stabilizer (dibutyl-tin-didodecyl mercaptide),
- 39 kg. of toluene,
- 37 kg. of methylene ethyl ketone, and
- 50 kg. of tetrahydrofuran.

The solvents are evaporated by exposure to hot air of about 40° C. and the artificial leather sheet is wound up.

Thereafter, the sheet is provided with a hair grain by means of an embossing calender as it is conventionally used in the plastic foil industry. For this purpose the sheet is heated to about 130° C. by means of an infrared radiation heater and is passed between a cooled, suitably engraved or embossed steel roller and a smooth rubberized counter roller under a pressure of about 50 kg./cm. of roller width whereafter the embossed sheet is cooled by means of cooled rollers.

The thus processed sheet is washed with water of 90° C. for 16 hours to remove therefrom the water-soluble components. Thereby, the washed sheet is passed every hour once through a pair of squeezing rollers, the rollers of which are pressed upon each other under a pressure of 10 kg./cm. of roller width. After squeezing off the water, the sheet is dried in warm air of 50–60° C.

Quality values of the resulting artificial leather:

Water vapor permeability—3700 g./100 sq. m./hr.
Air permeability—600 ml./100 sq. cm./min./cm. Hg.
Water absorption capacity determined from the coating surface—27% of its weight.

Example 5

(A)

- 100 kg. of an emulsifier-free polyvinyl chloride of the K-value 70 which is dispersible to a paste,
- 20 kg. of di-2-ethyl hexyl phthalate,
- 80 kg. of the adipic polyester of the saponification number 565 and a viscosity of about 20,000 cp. at 20° C., marketed under the trademark "ABG II" by Badische Anilin- & Soda-Fabrik of Ludwigshafen am Rhein, Germany,
- 5 kg. of iron oxide black, and
- 1.5 kg. of a mixture of barium laurate and cadmium laurate are stirred in a planet stirrer to a paste and are then passed once through a three-roll mill.

(B)

The resulting paste is mixed in a planet stirrer with 263 kg. of the polyvinyl alcohol-glycerol solution as described in Example 4 under (B).

The mixture is passed three times through a three-roll mill. The resulting spreadable paste is repeatedly applied to a cotton fabric of a weight of 140 g./sq. m. until the weight of the fabric is increased by 400 g./sq. m. After each application of the paste the coating is dried in warm air of 40° C. The coated and dried fabric is then completely dried with hot air of 100° C. for 15 minutes and subsequently is heated to about 200° C. to cause gelling of the coating.

The coated fabric is provided with a lacquer print by printing by means of a printing roller with a 14 dot screen as described in Example 4. The lacquer solvents are removed by drying with warm air of 40°C. and the resulting dot-lacquered sheet is provided with a grain in the same manner as described in Example 4.

The thus processed artificial leather sheet is freed of its water-soluble components by washing, squeezing, and drying as described in Example 4.

Quality values of the resulting artificial leather:

Water vapor permeability—4,150 g./100 sq. m./hr.
Air permeability—980 ml./100 sq. cm./min./cm. kg.
Water absorption capacity determined from the coating surface—33% of its weight.

Contact of the exposed coating surface of the artificial leather with a polystyrene sheet does not cause the polystyrene to become soft by plasticizer migration.

Example 6

A solution is prepared from
- 300 kg. polyvinyl alcohol,
- 965 kg. of water, and
- 35 kg. of glycerol.

280 kg. of said solution are mixed in a planet mixer with a paste compound of

- 100 kg. of an emulsifier-free polyvinyl chloride of the K-value 70 which is dispersible to a paste,
- 30 kg. of di-2-ethyl hexyl phthalate,
- 50 kg. of a solution of
  - 12.5 kg. of a polyvinylchloride-compatible linear polyurethane dissolve in
  - 37.5 kg. of dibutyl phthalate at 150° C. and diluted with
  - 6.0 kg. of toluene,
- 6 kg. of an emulsifier of the oleic acid-polyethylene oxide type, marketed by Badische Anilin- & Soda-Fabrik under the trademark "Emulphor A,"

2 kg. of a mixture of barium laurate and cadmium laurate, and 2 kg. of bone black.

The mixture is passed three times through a three-roll mill.

The resulting coating paste is applied to a dyed cotton fabric of a weight of 300 g./sq. m. in eight coating stages. The final weight of the coating is 500 g./sq. cm. After each coating step, the coating is dried in warm air of 30–40° C. After applying the eight coatings, the resulting coated fabric is dried in a hot air channel at 90–100° C. and gelling is effected at 190–200° C. for five minutes. The resulting coated fabric is then provided with a grain in a separate working step. It is freed of its water-soluble components by washing in a jigger with water of 90–100° C. whereby it is repeatedly passed therethrough. The water is squeezed off by means of a pair of squeezing rollers after each passage. Washing and squeezing out the water are repeated until a sample of the artificial leather, after drying at 90° C., exhibits a satisfactory water absorption capacity. After finally squeezing out the washed sheet by passing it through a pair of gummed rollers which are under a pressure of 10 kg./cm. of roller width, the resulting artificial leather sheet is dried in warm air of 90° C. The lacquer described in Example 3 under (C) is then printed on the sheet by means of a printing roller provided with a 14 dot screen and the sheet is dried in warm air of 40–50° C.

Quality values of the resulting artificial leather:

Water vapor permeability—1500 g./100 sq. m./hr.
Air permeability—500 ml./100 sq. cm./min./cm. Hg.
Water absorption capacity determined from the coating surface—39% of its weight.

Example 7

(A)

A solution is prepared from 300 kg. of polyvinyl alcohol,
480 kg. of water,
120 kg. of glycerol, and
13.5 kg. of sodium di-isobutyl naphthalene sulfonate.

(B)

A paste is produced by mixing in a planet stirrer 65 kg. of a polyvinylchloride with the K-value 70 which has a low emulsifier content and can be dispersed to a paste,
35 kg. of an emulsifier-containing polyvinyl chloride of the K-value 77 which is dispersible to a paste,
5 kg. of di-2-ethyl hexyl phthalate,
42 kg. of a plasticizer of an o-phthalic acid ester with straight-chain alcohols with 8 to 10 carbon atoms in their molecule, as marketed by Rheinpreussen GmbH. Hornberg, under the trademark "Reproxal 810,"
2.3 kg. of a liquid mixture of barium laurate and cadmium laurate stabilizer,
10 kg. of a non-ionogenic emulsifier of the oleic acid-polyethylene oxide type as marketed by the firm Badische Anilin- & Soda-Fabrik under the trademark "Emulphor A,"
6 kg. of lamp black,
1.2 kg. of colloidal sulfur,
0.8 kg of ethyl thiuram,
0.3 kg. of zinc ethyl phenyl dithiocarbamate,
1.6 kg. of finely dispersed zinc oxide, and
2.0 kg. of 2,2'-methylene bis-(4-methyl-6-tertiary butyl phenol).

The paste is passed once through a three-roll mill.

(C)

100 kg. of an aqueous anionic 40% acrylonitrile rubber latex of a medium acrylonitrile content (about 30% to 35%, by weight) as marketed by the firm B. F. Goodrich Chemical Co. under the trademark "Hycar 62," and 10 kg. of a non-ionogenic, aromatic polyglycol ether as marketed by the firm Farbenfabriken Bayer under the trademark "Emulvin W."

are thoroughly mixed with each other. The above described polyvinyl chloride paste is then admixed thereto in a planet stirrer and finally 265 kg. of the above mentioned glycerol-containing polyvinyl alcohol solution (A)

is stirred into the mixture. The resulting mixture is passed twice through a three-roll mill.

The resulting paste is then spread on a stripping paper weighing about 100 g./sq. m. After each coating, the paper is dried at about 30° C. for 30 minutes. The final weight of the coating is 500 g./sq. m. The coated paper is completely dried at 100° C. in a hot air drier for 15 minutes. Subsequently the coating is gelled by heating to 190° C. for 5 minutes and, after cooling to room temperature, is separated from the paper. Removing the water-soluble components from the resulting polyvinyl chloride sheet by washing and drying of the washed sheet are carried out as described in the preceding examples.

A self-supporting foil of the following quality values is produced in this manner.

Water vapor permeability—4450 g./100 sq. m./hr.
Air permeability—900 ml./100 sq. cm./min./cm. Hg
Water absorption capacity—31% of its weight
Impact resistance in the cold—does not break at —25° C.

Example 8

(A)

65 kg. of an emulsifier-free polyvinyl chloride of the K-value of 70, which is dispersible to a paste,
35 kg. of an emulsifier-containing polyvinyl chloride of the K-value 77 which is dispersible to a paste,
6 kg. of lamp black are mixed in a planet stirrer with (B)

42 kg. of a plastizer of an o-phthalic acid ester with straight-chain alcohols with 8 to 10 carbon atoms in their molecule, as marketed by Rheinpreussen GmbH. Hornberg, under the trademark "Reproxal 810,"
5 kg. of hexanol,
2.3 kg. of a liquid mixture of barium laurate and cadmium laurate stabilizer, and
10 kg. of a non-ionogenic emulsifier of the oleic acid-polyethylene oxide type as marketed by the firm Badische Anilin- & Soda-Fabrik, Ludwigshafen, under the trademark "Emulphor A"

to form a paste. The paste is passed once through a three-roll mill.

(C)

80 kg. of a latex containing about 50% of a four-component polymer composed of 20% of acrylonitrile, 3% of an unsaturated carboxylic acid, and the remainder being butadiene and styrene, as marketed by the firm Metallgesellschaft under the trademark "Synthomer 5040"

are slowly admixed in a planet stirrer to the above described paste (B). To this mixture there are added with stirring (D)

330 kg. of a polyvinylalcohol-glycerol solution prepared by dissolving
300 kg. of a polyvinyl alcohol,
700 kg. of water, and
120 kg. of glycerol.

The mixture is passed three times through a three-roll mill. The resulting paste is spread upon a stripping paper as described in Example 7, dried, gelled, separated from the paper, washed, and again dried.

A self-supporting foil of the following quality values is produced in this manner.

Water vapor permeability—3750 g./100 sq. m./hr.
Air permeability—980 ml./sq. cm./min./cm. Hg
Water absorption capacity—29% of its weight.

Example 9

(A)

65 kg. of an emulsifier-free polyvinyl chloride of the K-value of 70, which is dispersible to a paste, and
35 kg. of an emulsifier-containing polyvinyl chloride of the K-value 77, which is dispersible to a paste,
6 kg. of lamp black are mixed in a planet stirrer with (B)

30.5 kg. of a plasticizer of an o-phthalic acid ester with straight-chain alcohols with 8 to 10 carbon atoms in their molecule, as marketed by Rheinpreussen GmbH, Hornberg, under the trademark "Reproxal 810,"
10.5 kg. of di-2-ethyl hexyl phthalate,
5.0 kg. of hexanol,
2.3 kg. of a liquid mixture of barium laurate and cadmium laurate stabilizer, and
10.0 kg. of a non-ionogenic emulsifier of the oleic acid-polyethylene oxide type as marketed by the firm Badische Anilin- & Soda-Fabrik, Ludwigshafen, under the trademark "Emulphor A"

to form a paste. The paste is passed once through a three-roll mill.

(C)

100 kg. of a commercially available polyurethane emulsion as marketed by the firm Farbenfabriken Bayer A.G.

are slowly admixed to said paste in a planet stirrer. To this mixture there are added (D)

330 kg. of the polyvinyl alcohol glycerol solution prepared as described in Example 8(D).

The mixture is passed three times through a three-roll mill. The resulting paste is spread upon a stripping paper as described in Example 7, dried, gelled, separated from the paper, washed, and again dried.

A self-supporting foil of the following quality values is produced in the manner.

Water vapor permeability—3100 g./100 sq. m./hr.
Air permeability—730 ml./100 sq. cm./min./cm. Hg
Water absorption capacity—39% of its weight.

Example 10

(A) A solution is prepared from
300 kg. of polyvinyl alcohol,
480 kg. of water,
120 kg. of glycerol, and
13.5 kg. of sodium di-isobutyl naphthalene sulfonate.

(B) 16.5 kg. of a polyvinylchloride-compatible, linear polyurethane, are heated to about 150° C. with 42 kg. of a plasticizer of an o-phthalic acid ester with straight-chain alcohols with 8 to 10 carbon atoms in their molecule and as marketed by Rheinpreussen G.m.b.H., Hornberg, under the trade mark "Reproxal 810", and 5 kg. of di-2-ethyl hexyl phthalate.

The mixture is cooled to 90°–100° C. and then stirred at said temperature with 175 kg. of toluene until a clear solution is produced. Said solution is kneaded after cooling to about 70° C. with 65 kg. of a polyvinyl chloride with the K-value which has a low emulsifier content and can be dispersed to a paste.
35 kg. of an emulsifier-containing polyvinylchloride of the K-value 77 which is dispersible to a paste,
6 kg. of lampblack,
1.5 kg. of colloidal sulfur,
2.5 kg. of finely dispersed zinc oxide,
0.5 kg. of zinc ethyl phenyl dithiocarbamate,
2.0 kg. of 2,2'-methylene bis-(4-methyl-6-tertiary butyl phenol),
10.0 kg. of a non-ionogenic emulsifier of the oleic acid-polyethylene oxide type as marketed by the firm Badische Anilin- & Soda-Fabrik under the trademark Emulphor A, and
2.3 kg. of a liquid mixture of barium laurate and cadmium laurate stabilizer.

After cooling the resulting mixture to room temperature, there is admixed thereto in a planet stirrer a mixture of 100 kg. of an aqueous anionic 40% acrylonitrile rubber latex of a medium acrylonitrile content (about 30% to 35%, by weight) as marketed by the firm B. F. Goodrich Chemical Co. under the trademark Hycar 62,
10 kg. of a non-ionogenic aromatic polyglycol ether, as marketed by the firm Farbenfabriken Bayer under the trade mark "Emulvin W."

Finally there are admixed to the resulting mixture in the same planet stirrer 265 kg. of the polyvinyl alcohol-glycerol solution prepared as described hereinabove under (A).

The mixture is then passed twice through a three-roll mill. The resulting paste is spread upon a stripping paper as described in Example 7, dried, gelled, separated from the paper, washed and again dried.

A self-supporting foil of the following quality values is produced in this manner.

Water vapor permeability—3850 g./100 sq. m./hr.
Air permeability—900 ml./100 sq. cm./min./cm. Hg
Water absorption capacity—32% of its weight
Impact resistance in the cold—does not break at —25° C.

Example 11

(A)

65 kg. of an emulsifier-free polyvinylchloride of the K-value of 70, which is dispersible to a paste,
35 kg. of an emulsifier-containing polyvinylchloride of the K-value 77 which is dispersible to a paste, are mixed in a two-armed kneader with (B)

33 kg. of a polyvinylchloride-compatible linear polyurethane which was dissolved as described in Example 10(B) in 31 kg. of di-2-ethyl hexyl phthalate,
10.5 kg. of di-2-ethyl hexyl adipate, and
150 kg. of toluene.

(C)

To the resulting mixture there are added 10 kg. of a non-ionogenic emulsifier of the oleic acid-polyethylene oxide type as marketed by the firm Badische Anilin- und Sodafabrik, Ludwigshafen, under the trade mark "Emulphor A,"
2.3 kg. of a liquid mixture of barium laurate and cadmium laurate stabilizer, and
6 kg. of iron oxide black.

The resulting paste is passed once through a three-roll mill. The paste is then introduced into a vessel provided with a stirring device and (D)

330 kg. of a solution prepared by dissolving
300 kg. of polyvinyl alcohol in
700 kg. of water and
120 kg. of triethylene glycol are caused to run thereinto, while stirring. Stirring is continued until a homogeneous mixture is achieved. Said mixture is passed three times through a three-roll mill. The resulting spreadable paste is spread upon a cotton fabric, dried, gelled, washed, and again dried as described hereinabove in Example 3.

Quality values of the artificial leather obtained thereby:

Water vapor permeability—2100 g./100 sq. m./hr.
Air permeability—900 ml./100 sq. cm./min./cm. Hg
Water absorption capacity—28.5% of its weight.

Example 12

The spreadable paste prepared according to Example 7 is spread upon stripping paper as described in said Example 7. The paper is provided with a negative grain so that, on removing the paper, a positive grain is produced on the remaining polyvinylchloride sheet.

The paper is coated with a coating weighing 300 g./sq. m. and is passed through a gelling tunnel heated to 190–200° C. Immediately after leaving said tunnel, the coated paper is laminated on its paper-free surface to a tricot fabric weighing 140 g./sq. m. by means of a pair of pressure rollers. Before laminating, the tricot fabric is printed by means of a 14-dot printer roller with a 15% solution of a vinylchloride-vinyl acetate copolymer in methyl ethyl ketone and is freed of the methyl ethyl ketone by heating in warm air at 50° C.

After laminating the tricot fabric to the polyvinylchloride layer coated on the grained stripping paper, the laminate is cooled to room temperature and the paper is separated therefrom. The laminate is freed of its water-soluble components by repeatedly washing it with water of 90° C. and squeezing off the wash water and is then dried with hot air at about 90° C.

Quality values of the resulting artificial leather sheet:

Water vapor permeability—3000 g./100 sq. m./hr.
Air permeability—620 ml./100 sq. cm./min./cm. Hg
Water absorption capacity determined from the coating surface—24% of its weight.

Example 13

(A)

65 kg. of an emulsifier-free polyvinylchloride of the K-value of 70, which is dispersible to a paste, and
35 kg. of an emulsifier-containing polyvinylchloride of the K-value 77, which is dispersible to a paste, are mixed in a Z-armed kneader with 30 kg. of a polyvinylchloride-compatible, linear polyurethane, which was dissolved in a mixture of 150 kg. of toluene and
50 kg. of butanol by heating at about 90° C. for several hours. Thereafter, 31 kg. of di-2-ethyl hexyl phthalate,
16 kg. of di-2-ethyl hexyl adipate,
5 kg. of 2-ethyl hexanol, 10 kg. of a non-ionogenic emulsifier of the oleic acid-polyethylene oxide type as marketed by the firm Badische Anilin- und Sodafabrik under the trademark "Emulphor A,"
2.5 kg. of a liquid mixture of barium laurate and cadmium laurate stabilizer,
10 kg. of iron oxide red, and
2 kg. of 2,2'-methylene bis-(4-methyl-6-tertiary butyl phenol)

are kneaded into said polyvinylchloride-polyurethane mixture. The resulting organosol is passed once through a three-roll mill.

(B)

The organosol is mixed in a vessel provided with a stirring device with a solution of 80 kg. of a water-soluble polyvinyl alcohol derivative obtained by saponifying a graft polymer of vinyl acetate with poly-N-vinyl-N-methyl acetamide as described in German Auslegeschrift No. 1,260,789,
4 kg. of sodium di-isobutyl naphthalene sulfonate,
20 kg. of glycerol, and
300 kg. of water.

The mixture is passed three times through a three-roll mill. The resulting spreadable paste is coated on stripping paper and the coated paper is further processed as described hereinabove in Example 7.

A self-supporting foil of the following quality values is produced in this manner:

Water vapor permeability—4100 g./sq. m./hr.
Air permeability—900 ml./100 sq. cm./min./cm. Hg
Water absorption capacity—35% of its weight.

It is understood that, in place of the components given in the preceding examples, there may be employed other vinyl polymers, water-soluble vinyl compounds, plasticizers, and other macromolecular compounds and polymers as they are mentioned herinabove. Likewise, other water-soluble, hygroscopic compounds, solvents, pigments, stabilizers, anti-aging compounds, anti-oxidants, lubricants, and other additives as listed hereinabove may be added. Other vulcanization aids and/or cross-linking agents may be used for vulcanizing and/or cross-linking the polyacrylonitrile rubber or the polyurethane. The amounts of the various components, the manner in which the components are mixed and are converted into foils, the conditions, temperature, and duration, the apparatus employed, the manner in which the water-soluble components are removed from the foil, the further processing methods such as printing, embossing, lacquering, and the like, the materials to which the foils may be laminated and the manner in which said lamination is effected, and the like may be varied by those skilled in the art in accordance with the principles set forth herein and in the claims annexed hereto.

It may be mentioned that the process according to the present invention does not require complicated and expensive drawing calanders and the like apparatus but only the relatively simple and inexpensive devices as they are used for spread-coating of vinyl resins. In general the known methods and apparatus used in preparing vinyl organosols and plastisols and in producing coatings therefrom as they are described, for instance, in "Plastics Engineering Handbook," Reinhold Publishing Corporation, New York, 1954, and in "Ullmanns Encyclopaedie der technischen Chemie" 3rd edition, vol. 7, pp. 642 to 656 (1956), chapter on "Folien" (foils); vol. 11, pp. 620 to 629 (1969), chapter on "Lederaustauschstoffe (Kunstleder)" (leather substitute, artificial leather) and pp. 1 to 119 (1960), chapter on "Kunstostoffe" (plastics); vol. 14, pp. 107 to 310 and especially pp. 200 to 218 and 236 to 241 (1963), chapter on "Polymerisate" (polymers); vol. 12, pp. 167 to 185 (1960), chapter on "Makromolekeln" (macromolecular compounds); vol. 18, pp. 540 to 574

(1967); chapter on "Weichmachier" (plasticizers) can be used in the process according to the present invention.

These references are incorporated by reference in the present disclosure.

What is claimed is:

1. In a process of producing air- and water vapor-permeable, water-absorbing articles, the steps which comprise
   (a) preparing an aqueous solution of a water-soluble, film-forming polyvinyl alcohol compound selected from the group of polyvinylalcohol and acetyl group-containing polyvinyl alcohol,
   (b) preparing an intimately mixed paste of a substantially water insoluble vinyl polymer selected from the group consisting of polyvinylchloride and copolymers of vinyl-chloride and vinyl acetate and a plasticizer for such a vinyl polymer,
   (c) mixing said paste (b) of the vinyl polymer and plasticizer with the aqueous solution (a) of the macromolecular compound, in a proportion of at least 15 parts by weight of the polyvinyl alcohol compound to 100 parts by weight of the vinyl polymer,
   (d) working said mixture (c) while exposing it to the action of shearing forces,
   (e) applying the worked mixture (d) to a carrier material,
   (f) evaporating the water contained in said mixture (d) applied to the carrier material according to step (e) under conditions whereby substantially no bubble formation takes place,
   (g) gelling the vinyl polymer contained in the substantially water-free applied mixture of step (f),
   (h) removing the water-soluble polyvinyl alcohol compound (a) from the gelled article by washing with aqueous solutions, and
   (i) drying the resulting article to remove the aqueous wash solution.

2. The process according to claim 1, wherein the aqueous solution has added thereto, in addition to the macromolecular vinyl compound, a water-soluble, difficultly volatile, hygroscopic compound compatible with the vinyl compound.

3. The process according to claim 2, wherein the hygroscopic compound is glycerol.

4. The process according to claim 1, wherein the plasticizer of step (b) is a plasticizer selected from the group consisting of a liquid plasticizer and a mixture of a liquid and a solid plasticizer for said vinyl polymer.

5. The process according to claim 1, wherein the paste of step (b) has added thereto a solid, film-forming polymer compatible with and plasticizing the vinyl polymer.

6. The process according to claim 5, wherein the solid, film-forming polymer compatible with and plasticizing the vinyl polymer is a polyurethane, a butadiene copolymer with acrylonitrile, a butadiene copolymer with acrylonitrile and an unsaturated carboxylic acid, and a butadiene copolymer with acrylonitrile, styrene, and an unsaturated carboxylic acid.

7. The process according to claim 4, wherein the vinyl polymer of step (b) is a copolymer of vinylchloride and vinyl acetate.

8. The process according to claim 1, wherein the vinyl polymer-plasticizer paste is extended by the addition of volatile organic compounds which do not dissolve the vinyl polymer.

9. The process according to claim 1, wherein the carrier material is coated with the worked mixture of step (d).

10. The process according to claim 1, wherein the carrier material is impregnated with the worked mixture of step (d).

11. The process according to claim 1, wherein the carrier material is a fibrous web of a textile fiber material.

12. The process according to claim 1, wherein the carrier material is stripping paper and wherein the gelled, substantially water-free mixture of step (g) is separated from said stripping paper before subjecting it to steps (h) and (i).

13. The process according to claim 1, wherein the plasticizer is a liquid plasticizer added to the paste of step (b) in an amount up to 100 parts, by weight, of the plasticizer for 100 parts, by weight, of the vinyl polymer.

14. The process according to claim 1, wherein the plasticizer is a polymeric plasticizer added to the paste of step (b) in an amount up to 120 parts, by weight, of the plasticizer for 100 parts, by weight, of the vinyl polymer.

15. The process according to claim 5, wherein the solid, film-forming polymer compatible with and plasticizing the vinyl polymer is first dissolved in a volatile solvent therefor which solvent does not dissolve the vinyl polymer and wherein the resulting solution is then admixed to the paste of vinyl polymer and plasticizer.

16. The process according to claim 5, wherein the solid, film-forming polymer compatible with and plasticizing the vinyl polymer is first dissolved in part of the liquid plasticizer and a volatile solvent therefor which does not dissolve the vinyl polymer and wherein the resulting solution is then admixed to the paste of vinyl polymer and the remainder of the plasticizer.

17. The process according to claim 5, wherein an aqueous dispersion of the solid, film-forming polymer is admixed to the vinyl polymer and the plasticizer.

18. The process according to claim 1, wherein the worked mixture (d) contains a surface-active compound.

19. The process according to claim 5, wherein the solid, film-forming polymer compatible with and plasticizing the vinyl polymer is a vulcanizable polymer, wherein a vulcanization aid is present in the resulting mixture, and wherein the resulting article is vulcanized.

20. The process according to claim 5, wherein the solid, film-forming polymer compatible with and plasticizing the vinyl polymer is a polymer capable of being cross-linked, wherein a cross-linking agent is present in the resulting mixture, and wherein the resulting article is subjected to cross-linking reaction.

21. The process according to claim 1, wherein the article obtained in step (g) is subjected to a finishing process before carrying out the washing step (h).

22. The process according to claim 21, wherein the finishing process is an embossing process.

23. The process according to claim 21, wherein the finishing process is a process of providing the surface of the article with a grain.

24. The process according to claim 21, wherein the finishing process is a printing process whereby the printing ink is applied to the article surface by means of a fine point screen.

25. The process according to claim 21, wherein the finishing process is a lacquering process whereby the lacquer is applied to the article surface by means of a fine point screen.

26. The process according to claim 1, wherein the article obtained in step (g) is laminated to an air- and water vapor-permeable carrier material before carrying out the washing step (h).

27. The process according to claim 1, wherein gelling in step (g) is effected by heating to a temperature causing gelling of the respective vinyl polymer.

28. The process according to claim 1, wherein the water-soluble components are removed from the gelled article in step (h) by repeated washing with water of a temperature below its boiling point and squeezing out the wash water from the washed article.

29. The process according to claim 1, wherein the water-soluble, film-forming polyvinyl alcohol compound is present in the worked mixture of step (d) in an amount between about 25 parts, by weight, and about 60 parts, by weight, to 100 parts, by weight, of the mixture of vinyl polymer and plasticizer.

30. A microcapillary, air- and water vapor-permeable, water-absorbing article comprising an intimate mixture of a vinyl polymer selected from the group consisting of polyvinylchloride and a copolymer of vinylchloride and vinylacetate and a plasticizer therefor, said article having a microscopically fine cellular reticulate structure extending throughout the article, the cells thereof being interconnected with each other and connected with the outside and being of substantially uniform, microscopic size and cross-section, said article being prepared according to the process of claim 1, said article having an air permeability of at least 500 ml./100 sq. cm./min./cm. Hg, a water vapor permeability of at least 1000 g./100 sq. m./hour, and a water absorption capacity of at least 20% of its dry weight.

31. The article according to claim 30, comprising a coating of the mixture of vinyl polymer and the plasticizer on a supporting layer.

32. The article according to claim 30, comprising a supporting layer impregnated with said vinyl polymer and plasticizer mixture.

33. The article according to claim 30, wherein the vinyl polymer is selected from the group consisting of a homopolymer of vinylchloride and a copolymer of vinylchloride.

34. The self-supporting microcapillary air- and water-vapor-permeable, water-absorbing foil according to claim 30, said foil having a microscopically fine cellular reticulate structure extending throughout the foil, the cells thereof being interconnected and connected with the outside.

35. A laminate of an air- and water vapor-permeable, water-absorbing, microcapillary foil of an intimate mixture of a vinyl polymer selected from the group consisting of polyvinylchloride and a copolymer of vinylchloride and vinylacetate and a plasticizer therefor, said foil having a microscopically fine cellular reticulate structure extending throughout the foil, the cells being interconnected and connected with the outside and being of substantially uniform, microscopic size and cross-section, said foil being prepared according to the process of claim 1, said foil having a water vapor permeability of at least 1000 g./100 sq. m./hour, an air permeability of at least 500 ml./100 sq. cm./min./cm. Hg, and a water absorption capacity of at least 20% of its dry weight, and an air- and water vapor-permeable carrier material firmly laminated thereto.

36. The laminate according to claim 35, wherein the carrier material is a fibrous web.

References Cited

UNITED STATES PATENTS

| | | | |
|---|---|---|---|
| 2,819,981 | 1/1958 | Schornstheimer et al. | 260—2.5 X |
| 2,846,727 | 8/1958 | Bechtold | 264—49 |
| 3,020,597 | 2/1962 | Smith-Johannsen | 260—2.5 M |
| 3,375,208 | 3/1968 | Duddy | 260—2.5 M |

SAMUEL H. BLECH, Primary Examiner

W. J. BRIGGS, SR., Assistant Examiner

U.S. Cl. X.R.

5—361 B; 36—1, 44; 117—98, 135.5, 140 A; 156—219; 161—256; 260—2.5 M; 161—DIG 2, DIG 3; 260—2.5 P, 2.5 AY, 29.6 WA, 29.6 NR, 31.8, 41 AC, 859, 890, 891, 899; 264—49, 293

PO-1050
(5/69)

UNITED STATES PATENT OFFICE
CERTIFICATE OF CORRECTION

Patent No. 3,654,065           Dated April 4, 1972

Inventor(s) STEFAN DOROGI

It is certified that error appears in the above-identified patent and that said Letters Patent are hereby corrected as shown below:

Column 7, line 1: "produce" should read -- produced --; column 7, line 8: After "web" a comma -- , -- should be inserted; column 12, line 8: "surfae" should read -- surface --; column 12, line 12: "when" should read -- which --; column 12, line 70: After "acid" a hyphen -- - -- should be inserted; column 13, line 21: "and" should be cancelled; column 14, line 58: After "kg." -- of -- should be inserted; column 16, line 45: "plastizer" should read -- plasticizer --; column 20, line 71: "Kunstostoffe" should read -- Kunststoffe --; column 21, line 1: "Weichmachier" should read -- Weichmacher --.

Signed and sealed this 18th day of July 1972.

(SEAL)
Attest:

EDWARD M. FLETCHER, JR.           ROBERT GOTTSCHALK
Attesting Officer           Commissioner of Patents